Patented Oct. 6, 1936

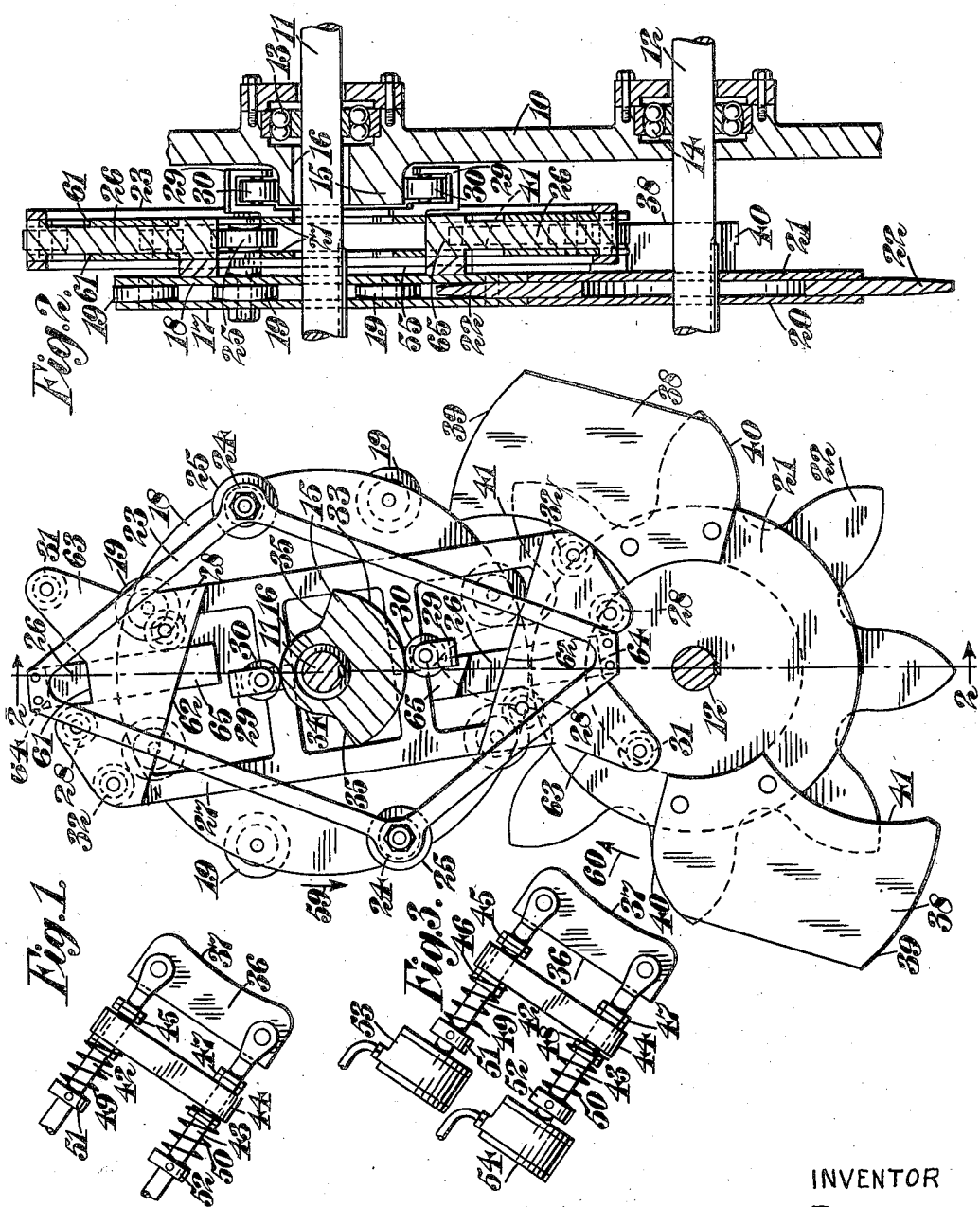

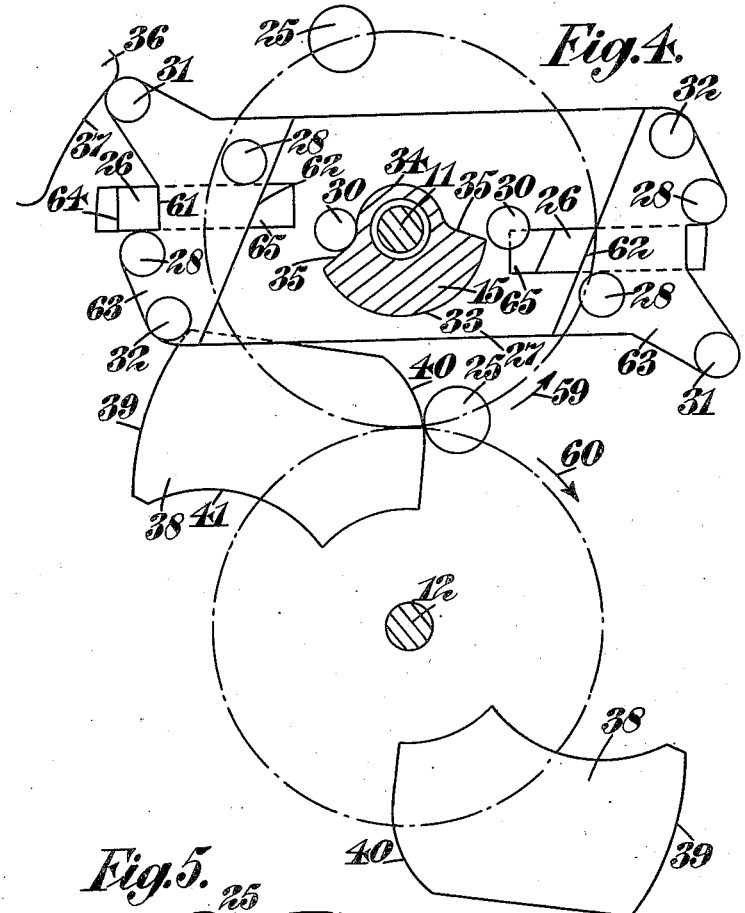
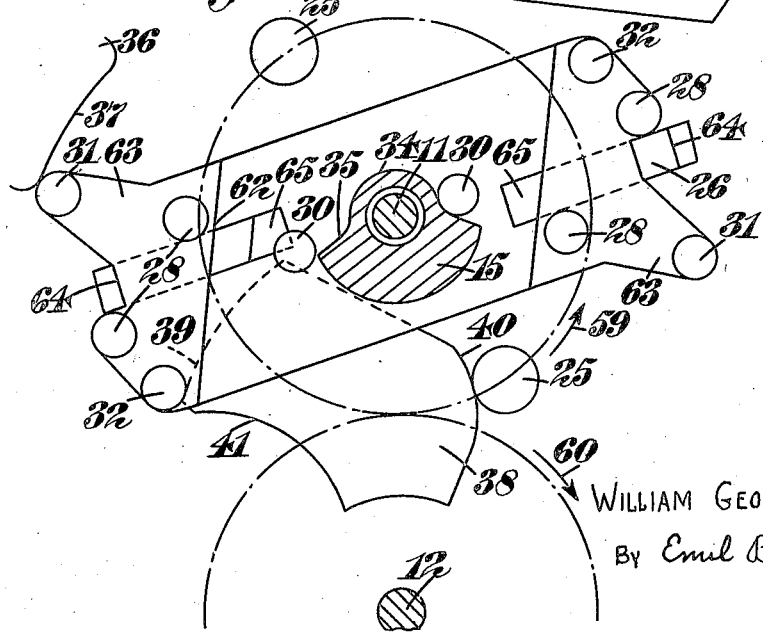

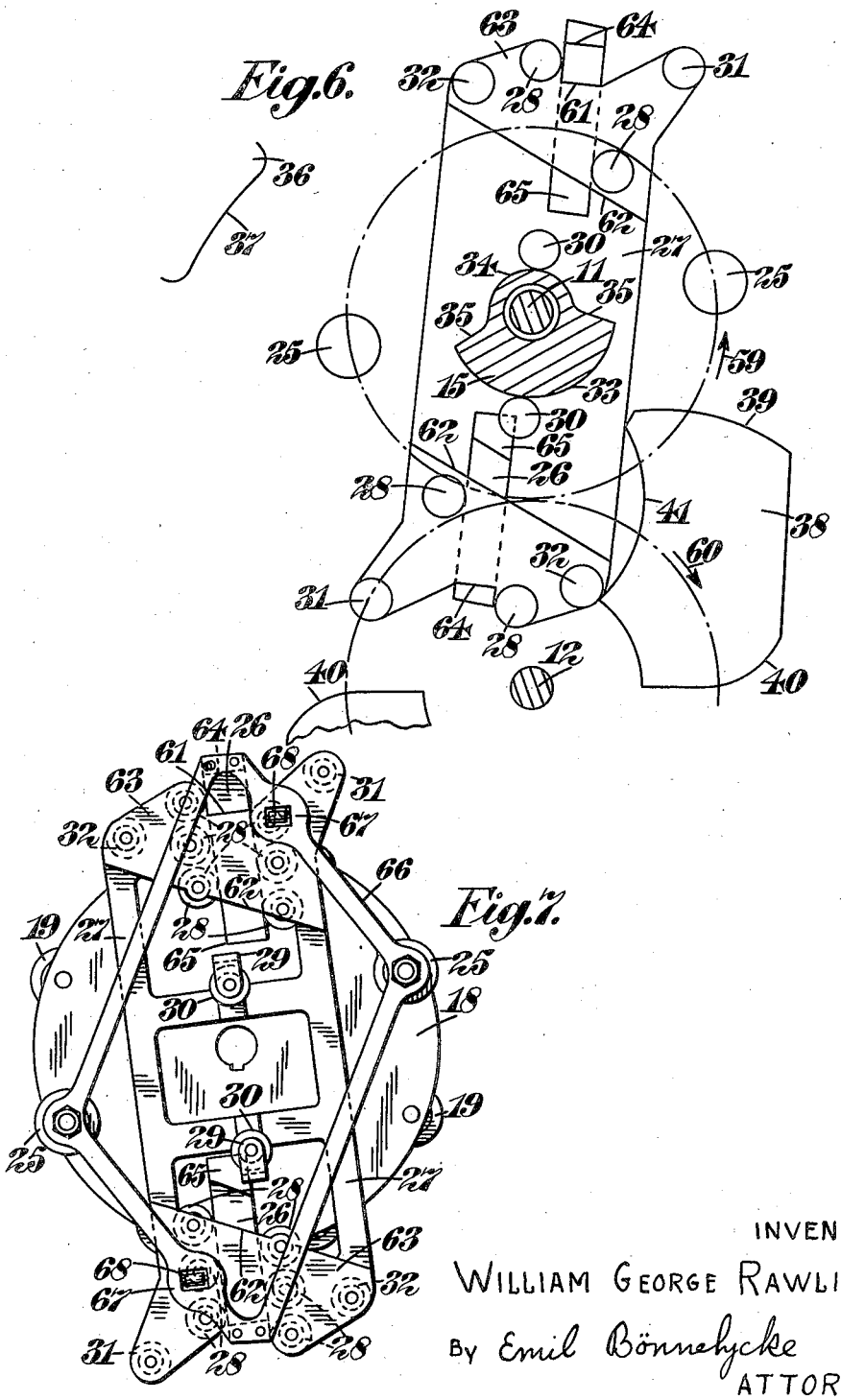

2,056,435

UNITED STATES PATENT OFFICE 2,056,435

MACHINE TO TRANSFORM PRESSURE OF A SIMPLE CHARACTER INTO A ROTATING MOTIVE FORCE

William George Rawlings, Netley Abbey, England

Application January 20, 1936, Serial No. 60,003
In Great Britain February 13, 1935

6 Claims. (Cl. 74—1)

This invention is for a machine to transform pressure of a simple character into a rotating motive force, and has for an object to provide a machine which is economical in operation. Another object is to provide a machine having its output governed by the pressure used and not by any loss which may be sustained by applying and removing this pressure.

According to the invention there is provided a pressure-operated machine for producing rotary motion, comprising a driven shaft, a cam-follower carriage mounted to rotate with the shaft and to be slidable along a guide-way carried by the shaft, means for controlling the position of the slidable carriage on the guideway, a cam-follower on the carriage and an intermittently-operated pressure-applying cam mounted on a fixed support and adapted to co-operate with the cam-follower in such manner as to cause the carriage to be impelled by a wedging action in the direction to rotate the shaft.

In practice, there will be a second shaft which is coupled to the first shaft to rotate in unison with the latter, but in the opposite direction, and a drive-transmitting cam mounted to rotate with said second shaft and having two cam-surfaces, one of which is engaged by a projection on the said slidable carriage and co-operates with the said guideway in exerting the said wedging action, while the other engages a cam-follower mounted to rotate with the said first shaft. The engagement between the drive-transmitting cam and the said projection and follower preferably takes place at the same time as the engagement between the pressure-applying cam and its follower.

In a preferred construction the guideway for the said carriage permits the latter to move radially of the said first shaft and there is provided a fixed cam disposed around the axis of the first shaft for controlling the sliding movement of the carriage.

A preferred embodiment of the invention will now be described by way of example and with reference to the accompanying drawings, in which:—

Figure 1 is a view in elevation of the operating parts of the machine,

Figure 2 is a cross-sectional view taken on the line 2—2 of Fig. 1, as viewed in the direction of the arrows, Figure 3 is a detailed view showing the pressure-applying cam and the means employed for operating it, Figures 4, 5 and 6 are diagrammatic views corresponding to Figure 1, but showing the parts in different positions, and Figure 7 is a detailed view corresponding to a portion of Figure 1, but showing a modified construction.

Like reference numerals indicate like parts throughout the drawings.

Referring to Figures 1 and 2, the machine comprises a rigid frame, part of which is shown at 10 (Figure 2) and two parallel shafts 11 and 12 rotatably mounted in ball bearings 13 and 14 carried by the frame 10. A stationary cam 15 is formed on or otherwise secured to the frame 10 and surrounds the shaft 11, being apertured at 16 for the passage of the shaft. Keyed to the shaft 11 there are two discs 17 and 18 which support between them at suitable points spaced apart around their periphery rollers 19. The latter rotate on anti-friction bearings carried on spindles extending between the discs 17 and 18. The shaft 12 has keyed to it two discs 20 and 21 disposed in line with the discs 17 and 18. The discs 20 and 21 carry between them one or more metal plates shaped to afford gear-teeth 22 adapted to engage between the rollers 19 on the discs 17 and 18. There are the same number of teeth 22 as there are rollers 19, so that the shafts 11 and 12 rotate in unison but in opposite directions.

Mounted on the disc 18 and between said disc and the cam 15 there is a quadrangular two-part guide-bracket 23, 55. Two opposite corners of this bracket are formed with bosses 24 by which the bracket is secured to the disc 18, there being interposed between the bosses 24 on the two parts 23, 55 of the bracket rollers 25 which are mounted to rotate on anti-friction bearings. The other corners of the bracket 23, 55 carry between the two parts of the bracket inwardly-directed guide-plates 26 constituting guideways on which a slidable carriage 27 may reciprocate. The carriage 27 is mounted between the two parts of the bracket 23, 55 and it is also made of two-part construction so as to straddle the guide-plates 26. Between the two parts of the carriage 27 there are rotatably mounted on it pairs of rollers 28 which are supported on anti-friction bearings and ride on the guide-plates 26. Thus it will be seen that the carriage 27 is mounted to rotate with the shaft 11 and to be slidable along the guide-plates 26. The sliding movement of the carriage is limited by the engagement between the edges 61 and 62 of plates 63 on the ends of the carriage and abutments 64 and 65 on the guide-plates 26. The carriage also has mounted on it brackets 29 supporting rollers 30 which are also mounted on anti-friction bearings and which bear against opposite surfaces of the cam 15. In addition the carriage 27 carries at each end rollers 31 and 32, to be referred to later, each mounted on anti-friction bearings.

The cam 15 is formed with a raised surface 33 and a depressed surface 34 with intermediate inclined surfaces 35 joining the surfaces 33 and 34. The cam surfaces are so arranged that during the rotation of the shaft 11 the rollers 30 on the carriage 27 remain in contact with opposite portions of the cam surfaces, without any substantial play. Thus it will be seen that the cam 15 serves to control the position of the carriage 27 on the guide-plates 26 during the rotation of the shaft 11. The angular setting of the cam 15 is such that when each of the rollers 31 comes into engagement with an intermittently-operated pressure-applying cam 36, the rollers 30 reach the portions 35 of the cam 15 and the carriage commences to slide along the guide-plates 26 in the direction to move the cam-engaging roller 31 radially outwardly away from the shaft 11. The pressure-applying cam 36 supplies the motive power for rotating the shafts 11 and 12, and it has a concave cam surface 37 which, when pressure is exerted through a rod 42 and no pressure is exerted through a rod 43 supplies a variable pressure all along the said cam surface 37, thereby applying a variable pressure to the roller 31 causing a wedging effect between the guideway 26 and a cam edge 39. The carriage 27 then of its own accord follows the line of least pressure and moves so that its end which is adjacent to the cam 37 travels outwards away from the shaft 11 causing the shafts 11 and 12 to rotate in the directions of the arrows 59 and 60 with a speed determined by the pressure and by the size of the machine. The cam 36 thus co-operates with the roller 31 in such a manner as to cause the carriage 27 to be impelled by a wedging action in the direction to rotate the shafts 11 and 12.

Mounted at diametrically opposed positions on the disc 21 are two drive-transmitting cams 38 disposed in line with the reciprocating carriage 27 and adapted to engage the rollers 25 and 32. Each cam 38 has cam surfaces 39 (to which reference has already been made) and 40. The cam surfaces 39 are adapted to be engaged by the rollers 32 on the carriage 27, while the cam surfaces 40 engage the rollers 25. The cams 38 are cut away at 41 to avoid the possibility of the sliding carriage 27 fouling them during the rotation of the parts.

The pressure-applying cam 36 is supported at its ends on the aforesaid reciprocable rods 42 and 43 passing through a bracket 44 mounted on a fixed part of the frame of the machine. The rods 42 and 43 carry abutments 45, 46 and 47, 48 which co-operate with the bracket 44 so that each rod is permitted a very minute amount of reciprocatory movement which is just sufficient to allow the pressure to be applied and removed. This minute amount of movement is governed by any expansion and contraction there may be in the whole of the machine. The rods also carry compression springs 49 and 50 disposed between the bracket 44 and collars 51 and 52 fixed to the rods.

Assuming the discs 17, 18 and 20, 21 are to be rotated in the direction of the arrows 59 and 60 (Figures 1, 4, 5 and 6), the parts are first brought to the position shown in Figure 4. In this position the left-hand roller 31 is in engagement with the top end of the cam surface 37 and the carriage 27 is in the position in which that end of it which is adjacent to the pressure-applying cam 36 is nearest to the shaft 11. In this position of the parts the roller 32 on this end of the carriage is in engagement with the beginning of the cam surface 39 on one of the cams 38, and the surface 40 of the same cam is in engagement with one of the rollers 25 carried by the disc 18 on the shaft 11. Pressure is then applied through the rod 42 and the cam 36 to the roller 31, while no pressure is applied through the rod 43. The rods 42 and 43 are operated by any means whereby pressure can be exerted and removed. The means of pressure are not included in this invention, although in Figure 3 of the drawings there are shown diagrammatically and merely by way of example, air-pressure applying units 53 and 54 including control valves the timing of which may be effected in any convenient way. As the roller 31 moves along the cam surface 37 the adjacent roller 32 projecting from the carriage 27 bears on and moves along the cam surface 39 and thereby transmits a drive to the discs 20 and 21 and also to the discs 17 and 18 and the shafts 11 and 12. During this movement of the parts the left-hand roller 30 on the carriage rides up one of the portions 35 of the cam 15 so as to cause the carriage 27 to be moved to the other extreme of its travel along the guide-plates 26. It will be seen that the latter are so disposed that the carriage moves radially of the shaft 11. It will be appreciated that the co-operation between the cams and rollers provides that the thrust to rotate the shafts is applied through a relatively wide angle of rotation of the shafts. The position of the parts as the roller 31 is about to leave the cam surface 37 is shown in Figure 5. After the roller 31 has left the cam surface 37 pressure is taken off the rod 42 allowing the spring 49 to return the rod 42 so that its abutment 45 bears against the bracket 44. The momentum of the parts continues rotation of the shafts until the roller 31 at the opposite end of the carriage is brought into co-operation with the end of the cam surface 37. (It is now touching the cam surface 37 with no pressure exerted through the rod 42.) To make the next impulse pressure is again applied through the rod 42 and the cycle of operations as described above is repeated. Figure 6 illustrates a position of the parts after continued movement from the position shown in Figure 5, and it shows how the cut-away portion 41 of the cam 38 permits passage of the lower part of the carriage.

The power output of the machine (which can be taken from either or both of the shafts 11 and 12) depends mainly on the pressure applied to the cam 36 and partly on the distances between the roller 31 and the shafts 11 and 12. By applying pressure through the rod 43 and having no pressure acting through the rod 42 the machine may be reversed. Also by suitable pressure applied through one or both of the rods 42 and 43 braking of the machine may be effected.

The modified construction shown in Figure 7 corresponds to that shown in Figures 1 and 2 except that additional rollers 28 are provided to run on the guide-plates 26. Also in the construction of Figure 7 a modified bracket 66 is employed in place of the bracket 23, 55. The bracket 66 is formed with apertured enlargements 67 in which are mounted on anti-friction bearings rollers 68 bearing on the plates 63, these rollers being provided to reduce frictional resistance to the sliding movement of the carriage. In the construction of Figure 7 the bracket 66 is of two-part formation (as in the first described construction) with the carriage 27 sliding between the two parts of the bracket. On each part of the bracket there are two enlargements 67 each carrying a roller 68. If desired the construction may be modified so that on each part of the bracket 66 there are four enlargements 67 and rollers 68, the additional enlargements being formed on the top left hand and bottom right hand portions of the bracket 66 as seen in Figure 7.

The construction described above can be modified in various ways without departing from the invention. For instance, instead of having the cam 15 shaped as shown in the drawings it may take the form of an eccentric providing the cams 36 and 38 are suitably modified as to shape and/or disposition.

I claim:—

1. A pressure-operated machine for producing rotary motion, comprising a fixed frame, a driven shaft mounted on said frame, a guideway carried by the shaft, a carriage mounted to rotate with the shaft and to be slidable along the said guideway, means for controlling the position of the slidable carriage on the guideway, a cam-follower on the carriage, a fixed support, and an intermittently-operated pressure-applying cam mounted on said support to co-operate with the cam-follower and thereby cause the carriage to be impelled by a wedging action in the direction to rotate the shaft.

2. A pressure-operated machine for producing rotary motion, comprising a fixed frame, a driven shaft mounted on said frame, a guideway carried by the shaft, a carriage mounted to rotate with the shaft and to be slidable along the said guideway, means for controlling the position of the slidable carriage on the guideway, a cam-follower on the carriage, a fixed support, an intermittently-operated pressure-applying cam mounted on said support to co-operate with the cam-follower and thereby cause the carriage to be impelled by a wedging action in the direction to rotate the shaft, a second shaft, means coupling the second shaft to the first shaft to rotate in unison therewith but in the opposite direction, a projection on the said slidable carriage, a second cam-follower mounted to rotate with the first shaft, and a drive-transmitting cam mounted to rotate with said second shaft and provided with two cam-surfaces one of which is adapted to be engaged by the said projection on the carriage and to co-operate with the said guideway in exerting the said wedging action, while the other engages the said second cam-follower.

3. A pressure-operated machine for producing rotary motion, comprising a fixed frame, a driven shaft mounted on said frame, a guideway carried by the shaft, a carriage mounted to rotate with the shaft and to be slidable along the said guideway, means for controlling the position of the slidable carriage on the guideway, a cam-follower on the carriage, a fixed support, an intermittently-operated pressure-applying cam mounted on said support to co-operate with the cam-follower and thereby cause the carriage to be impelled by a wedging action in the direction to rotate the shaft, a second shaft, means coupling the second shaft to the first shaft to rotate in unison therewith but in the opposite direction, a projection on the said slidable carriage, a second cam-follower mounted to rotate with the first shaft, and a drive-transmitting cam mounted to rotate with said second shaft and provided with two cam-surfaces one of which is adapted to be engaged by the said projection on the carriage, while the other engages the said second cam-follower, with the drive-transmitting cam timed to co-operate with the projection on the carriage and with the said second cam-follower simultaneously with the engagement between the pressure-applying cam and the first cam-follower.

4. A pressure-operated machine for producing rotary motion, comprising a fixed frame, a driven shaft mounted on said frame, a slidable carriage mounted to rotate with said shaft, a guideway carried by said shaft for guiding the carriage to move substantially radially of said shaft, a fixed cam disposed around the axis of said shaft for controlling the sliding movement of the carriage, a cam-follower on the carriage, a fixed support, and an intermittently-operated pressure-applying cam mounted on said support to co-operate with the cam-follower and thereby cause the carriage to be impelled by a wedging action in the direction to rotate the shaft.

5. A pressure-operated machine for producing rotary motion, comprising a fixed frame, a driven shaft mounted on said frame, a slidable carriage mounted to rotate with said shaft, a guideway carried by said shaft for guiding the carriage to move substantially radially of said shaft, a fixed cam disposed around the axis of said shaft for controlling the sliding movement of the carriage, a cam-follower on the carriage, a fixed support, an intermittently-operated pressure-applying cam mounted on said support to co-operate with the cam-follower and thereby cause the carriage to be impelled by a wedging action in the direction to rotate the shaft, a second shaft, means coupling the second shaft to the first shaft to rotate in unison therewith but in the opposite direction, a projection on the said slidable carriage, a second cam-follower mounted to rotate with the first shaft, and a drive-transmitting cam mounted to rotate with said second shaft and provided with two cam-surfaces one of which is adapted to be engaged by the said projection on the carriage, and to co-operate with the said guideway in exerting the said wedging action, while the other engages the said second cam-follower.

6. A pressure-operated machine for producing rotary motion, comprising a fixed frame, a driven shaft mounted on said frame, a slidable carriage mounted to rotate with said shaft, a guideway carried by said shaft for guiding the carriage to move substantially radially of said shaft, a fixed cam disposed around the axis of said shaft for controlling the sliding movement of the carriage, a cam-follower on the carriage, a fixed support, an intermittently-operated pressure-applying cam mounted on said support to co-operate with the cam-follower and thereby cause the carriage to be impelled by a wedging action in the direction to rotate the shaft, a second shaft, means coupling the second shaft to the first shaft to rotate in unison therewith but in the opposite direction, a projection on the said slidable carriage, a second cam-follower mounted to rotate with the first shaft, and a drive-transmitting cam mounted to rotate with said second shaft and provided with two cam-surfaces one of which is adapted to be engaged by the said projection on the carriage, while the other engages the said second cam-follower, with the drive-transmitting cam timed to co-operate with the projection on the carriage and with the said second cam-follower simultaneously with the engagement between the pressure-applying cam and the first cam-follower.

WILLIAM GEORGE RAWLINGS.